March 18, 1930. J. L. SCHALLER 1,750,819
TEMPORARY PIPE SUPPORT
Filed Jan. 2, 1929  2 Sheets-Sheet 1
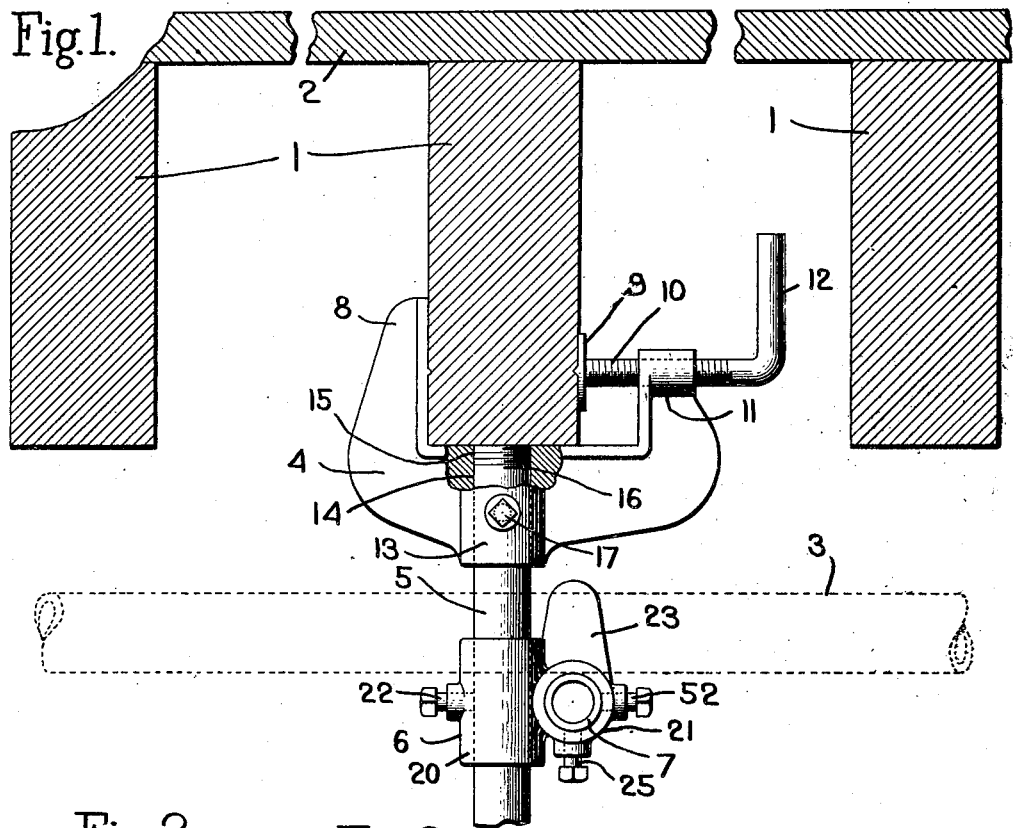
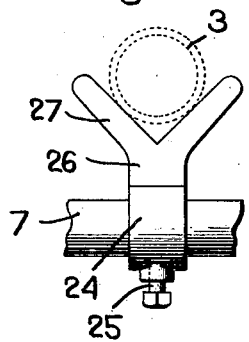
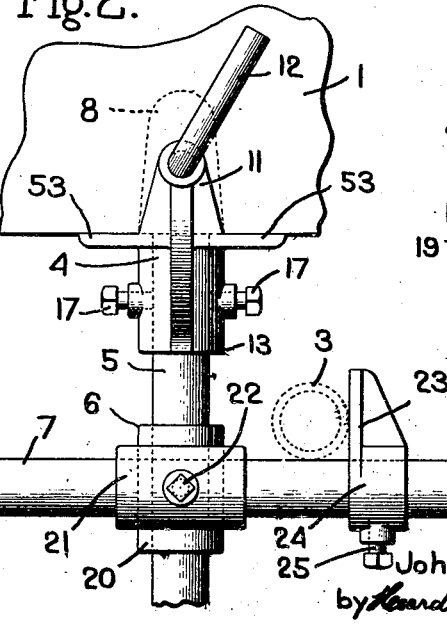
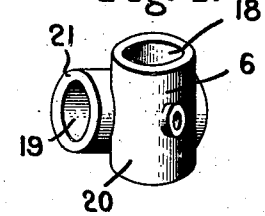
Inventor,
John L. Schaller
by Howard Smith & Tennant
Attys.

March 18, 1930.  J. L. SCHALLER  1,750,819
TEMPORARY PIPE SUPPORT
Filed Jan. 2, 1929   2 Sheets-Sheet 2
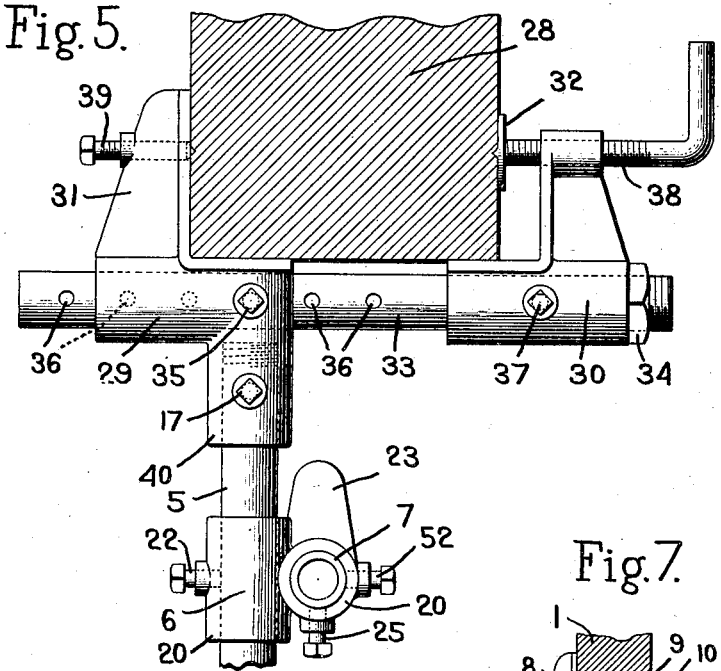
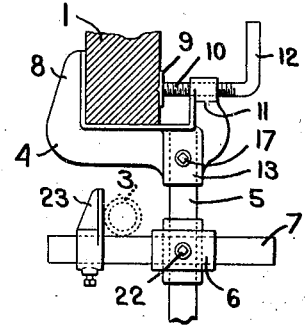
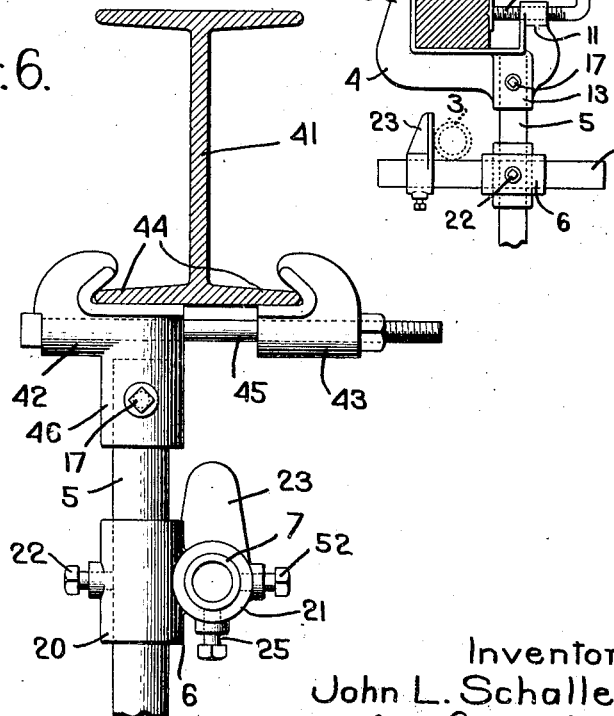
Inventor.
John L. Schaller
by Heard Smith & Tennant
Attys.

Patented Mar. 18, 1930

1,750,819

UNITED STATES PATENT OFFICE

JOHN L. SCHALLER, OF WELLESLEY, MASSACHUSETTS

TEMPORARY PIPE SUPPORT

Application filed January 2, 1929. Serial No. 329,903.

This invention relates to a temporary pipe support adapted for use by plumbers, steam fitters, etc., to assist them in running a line of piping.

In installing water pipes or steam pipes in a building under construction, and especially the pipes extending in a horizontal direction, it is customary to provide some kind of temporary support for each length of pipe after it has been threaded and by which the pipe may be supported while it is being connected to the fitting or to another length of pipe. These temporary supports are frequently wooden hangers which are made on the job or sometimes wire hangers are used for this purpose. In the making of the wooden hangers, for instance, it is necessary to take careful measurements in order that when a wooden hanger is installed, it may support the pipe at the right elevation. A wire support may answer for a small pipe but for a larger pipe such as is used in steam-heating systems it is hardly adequate.

My invention provides a novel temporary pipe support which can be readily secured to the floor beams and by means of which the pipe to be installed can be supported at any desired elevation.

In order to give an understanding of the invention I have illustrated in the drawings a selected embodiment thereof which will now be described after which the novel features will be pointed out in the appended claims.

In the drawings, Fig. 1 is a view illustrating my improved temporary pipe support secured to a wooden floor joist;

Fig. 2 is a side view of Fig. 1;

Fig. 3 is a view illustrating a different form of machine for the pipe than that shown in Figs. 1 and 2;

Fig. 4 is a perspective view of one of the fittings of the device;

Fig. 5 is a view similar to Fig. 1 but showing a clamp adapted to secure the temporary support to a concrete beam;

Fig. 6 is a view illustrating a type of clamp which may be used for clamping the support to an iron beam;

Fig. 7 shows a modification of the invention.

The drawings show the invention as it will be used for temporarily supporting a pipe which is to be run close to the ceiling of the room and in said Figure 1 indicate wooden floor beams or floor joists on which a floor 2 of a building is supported. The pipe to be installed is indicated by the dotted line 3 and it is to be placed just below the floor joist 1 at the upper portion of the room below the floor 2.

My improved temporary support comprises a clamping member 4 adapted to be clamped to one of the floor joists or overhead beams, a suspender 5 detachably secured to the clamp 4 and suspended therefrom, a bracket or fitting 6 adjustably mounted on the suspender 5 and a supporting arm 7 adjustably carried by the fitting 6 and which forms a support for the pipe 3.

The clamping member 4 may be constructed in different ways depending on the character of the beam to which it is to be secured. If the building has wooden floor joists or beams 1, a clamp such as shown in Fig. 1 is suitable. This clamp is provided with the fixed jaw 8 adapted to engage one face of the floor joist 2 and also provided with the clamping jaw 9 adapted to engage the opposite face of said floor joist, the clamping face 9 being swivelled on the end of a screw 10 which is screw threaded into the arm 11 of the clamp and which is provided with a handle 12 by which it may be operated. The clamping member 4 is provided with a boss 13 having a vertical opening therethrough to receive the upper end of the suspender 5. This suspender may conveniently be a length of piping such as would be found on the job, although the particular shape of the suspender is not essential to the invention.

As shown in Fig. 1 the boss 13 has the opening 14 into which the upper end of the pipe 5 is received and said opening is internally screw threaded at its upper end as shown at 15 to receive the screw-threaded end 16 of the pipe 5. 17 indicates a set screw carried by the boss 13 and adapted to engage the pipe 5, said set screw assisting to hold the suspender in place.

This suspender 5 may be of any desired length depending on the requirements of use. The bracket or fitting 6 is provided with a vertically-extending aperture 18 to receive the pipe 5 and a horizontally-extending aperture 19 through which the supporting arm 7 extends. In the construction shown this bracket member 6 is made with the vertical cylindrical portion 20 through which the aperture 18 extends and the horizontal cylindrical portion 21 through which the aperture 19 extends, these two cylindrical portions being integral with each other but each offset with relation to the other. The supporting arm 7 may also be a length of piping such as would be found on the job.

The bracket member 6 is freely adjustable vertically on the suspender 5 and it carries a set screw 22 by which it may be locked in adjusted position.

The supporting arm 7 has a guide or pipe-positioning element adjustably mounted thereon. In Figs. 1 and 2 this element is indicated at 23 and is in the form of an upstanding finger, said element having an apertured hub 24 through which the pipe 7 extends and being held in adjusted position by a set screw 25. In the construction shown in Fig. 3 the pipe-positioning member is indicated at 26 and it is provided with the Y portion 27 adapted to receive the pipe 3. The positioning member 26 is adjustably secured to the pipe 7 in the same manner as described with reference to the positioning member 23.

If it is assumed that it is desired to run a length of piping 3 transversely to the floor joists 1 and at a certain distance below said floor joists then one or more of the clamping members 4 will be attached to the floor joists as shown in Fig. 1 and a suspender 5 will be secured to each clamp. The bracket fitting 6 is then applied to each suspender and arranged at the height required for the pipe 3. This is a simple thing to do as it is easy to measure from the floor joist and then to adjust the bracket 6 to the right position and set up the screw 22. In making this adjustment of the supporting bracket 6 it will be given such a position about the axis of the pipe 5 that the opening 19 will extend in a direction at substantially right angles to the desired direction of the pipe 3 to be installed. The pipe-supporting arm 7 may then be inserted in the aperture 19 and clamped in position and said arm 7 will thus provide a support for the pipe 3 which will hold it at the proper elevation so that it can be readily screwed into another length of pipe or some fitting which has already been set in place.

The positioning member 23 may be used to keep the pipe 3 from lateral movement while it is being screwed to the fitting or the other pipe. Looking at Fig. 3 and assuming that the end of the pipe 3 away from the observer is being screwed into another pipe it will be understood that the pipe 3 will be turned clockwise in Fig. 2 and without the positioning member 23 such clockwise turning movement of the pipe would tend to roll it along the arm 7 and thus displace it from its true right line position. The positioning finger 23 prevents this and ensures that the pipe will be retained in its correct position while it is being screwed into another length of pipe.

If the pipe 3 which is being installed is to run in a direction parallel to the floor joist 2 then the bracket fitting 6 will be turned on the pipe or suspender 5 into a position at right angles to that shown in Figs. 1 and 2 so that the supporting arm 7 will extend at right angles to the length of the floor joist.

Sometimes it is desirable to run the pipe 3 parallel to and directly under a floor joist. The form of clamp shown in Fig. 7 is specially suitable for this purpose. This clamp is similar to the clamp shown in Fig. 1 except that the apertured boss 13 is situated near the arm 11 so that when the clamp is applied to a floor joist the hanger 5 will not be directly under the floor joist. With this arrangement it is possible to so adjust the bracket 6 and the supporting arm 7 that the pipe 3 to be supported will be situated directly underneath and parallel to the floor joist to which the clamp 4 is secured.

The construction shown in Fig. 5 is similar to that above described except that the clamp is specially designed for use in connection with a concrete beam 28. This clamp comprises two members 29 and 30 carrying the two clamping jaws 31 and 32 respectively. These two members 29 and 30 are connected by a rod 33 which extends through an opening in each member. Said rod 33 is provided at one end with a nut 34 which bears against the end of the member 30 and the member 29 is slidably mounted on the rod and is held in adjusted position by means of a set screw 35 which is adapted to enter any one of a plurality of apertures 36 formed in the rod 33. The member 30, which may also be clamped to the rod 33 by a set screw 37, carries the adjustable clamping member 32 which is swivelled to the end of the screw-threaded stem 38. The clamping jaw 31 is shown as carrying a set screw 39 which has a pointed end and is adapted to be forced into the concrete 28 thereby to more securely hold the clamp in place. The member 29 of the clamp is provided with the boss 40 in which the suspender 5 is supported as above described, said suspender having the bracket fitting 6 adjustably mounted thereon and the latter carrying the supporting arm 7 all as above set forth.

In Fig. 6 a form of clamp is shown which is specially designed to be secured to an eye beam 41. This clamp comprises the two clamping members 42 and 43 each shaped to embrace the lower flanges 44 of the eye beam, said members being clamped together by means of a suitable clamping rod 45. The member 42 is provided with the apertured boss 46 in the aperture of which the upper end of the suspender 5 is secured.

In the construction illustrated and described the pipe-supporting arm 7 extends both sides of the suspender as clearly seen in Fig. 2 so that it is possible to support a pipe on either side of the suspender. Furthermore, this pipe-supporting arm is adjustable horizontally in the direction of its length and can thus be easily placed in the necessary position to properly support the pipe 3.

It will be noted that the clamp 4 is provided with two ears 53 (see Fig. 2) which underlie the overhead support 1. These ears are to provide the clamp with an extended bearing on the under face of the support so as to hold the clamp more rigidly in position.

The connection between the suspender 5 and the clamp 4 is a rigid one and this fact in connection with the ears 53 bearing on the under side of the overhead support serves to maintain the suspender in a correct vertical position even when the pipe 3 is supported on the arm 7 at a distance from the suspender. The ears 53 prevent the clamp from swinging out of true vertical position and the rigid connection between the suspender and the clamp maintains said suspender in vertical position.

While I have illustrated some selected embodiments of my invention I do not wish to be limited to the constructional features shown.

The device embodying my invention can be quickly installed in correct position to support properly the pipe 3 regardless of the direction in which the pipe 3 is to be run and when a length of pipe 3 is supported on a properly adjusted support it will be correctly and accurately positioned for being screwed into a fitting or other length of pipe which has already been installed.

If the pipe 3 is a long length of pipe so that it is desirable to use more than one pipe support then the necessary number of pipe supports may be attached to the overhead beams and the bracket arms 6 correctly positioned on the suspenders 5, the supporting arms 7 being removed. The length of pipe 3 may then be lifted up into position and the arms 7 inserted into the fittings 6 underneath the pipe 3 and when this is done said pipe will be properly adjusted. This plan of operation avoids the necessity of drawing a long length of pipe through temporary hangers as it is necessary to do where wooden hangers are used.

While I have described the invention as a temporary pipe support yet it may be equally well used for supporting other articles while being installed, such for instance as timbers or iron beams, etc.

I claim:

1. A temporary pipe support for use in running a length of pipe, said support comprising a clamping member adapted to be clamped to an overhead support, a suspender detachably but rigidly secured to the clamping member and depending therefrom, a bracket fitting adjustable on said suspender, a pipe-supporting arm carried by the fitting and adjustable horizontally relative thereto, and a pipe-positioning element adjustably secured on said arm.

2. A temporary pipe support for use in running a length of pipe comprising a clamping member adapted to be clamped to an overhead support, said clamping member having an apertured boss provided with interior screw threads, a suspender having its upper end inserted in and fitting said aperture and provided with screw threads to engage those of the boss whereby the suspender is rigidly connected to the boss, a bracket member adjustably secured to said suspender and adapted to be adjusted vertically on said suspender and also turned into different positions about the suspender, a horizontal pipe-supporting arm carried by said bracket and adjustable in the direction of its length, and a pipe-positioning element adjustably carried by said arm.

3. A temporary pipe support for use in running a length of pipe, said support comprising a clamping member adapted to be clamped to an overhead support, a tubular suspender detachably secured to and depending from the clamping member, a fitting adjustable on said suspender and having two cylindrical portions integral with but arranged at right angles to each other, and offset from each other, the suspender extending through one of said cylindrical portions, a tubular supporting arm extending through the other cylindrical portion and adjustable therein, and a pipe-positioning element adjustably secured to said supporting arm.

4. A temporary pipe support for use in running a length of pipe, said support comprising a clamping member adapted to be clamped to an overhead support, a suspender detachably but rigidly secured to said clamping member and depending therefrom, a one-piece fitting adjustable on said suspender and provided with two openings extending at right angles to each other and through one of which the suspender passes, said fitting being vertically adjustable on the suspender, means for locking the fitting in adjusted position, a pipe-supporting arm extending through the other opening of the fitting, and a pipe-supporting element adjustably secured to said supporting arm.

5. A temporary pipe support for use in running a length of pipe, said support comprising a clamping member adapted to be clamped to an overhead support, a suspender detachably but rigidly secured to the clamping member and depending therefrom, a bracket fitting adjustable vertically on said suspender, a horizontally-extending pipe-supporting arm carried by said fitting and adjustable horizontally relative to the suspender, and a pipe-positioning element adjustably secured on said arm.

6. A temporary pipe support for use in running a length of pipe, said support comprising a clamping member adapted to be clamped to an overhead support, a suspender detachably but rigidly secured to the clamping member and depending therefrom, a bracket fitting adjustable vertically on said suspender, a horizontally-extending pipe-supporting arm carried by said fitting and extending laterally both sides of the suspender, said arm being adjustable in the fitting in the direction of its length and a pipe-positioning element adjustably secured to said arm.

7. A temporary pipe support for use in running a length of pipe, said support comprising a clamping member adapted to be clamped to an overhead support, said clamping member having ears to underlie said support and provide an extended bearing surface between the clamp and support, a suspender detachably but rigidly secured to the clamping member and depending therefrom, a bracket fitting adjustable vertically on said suspender, means to clamp the bracket fitting in adjusted position, a horizontally-extending pipe-supporting arm carried by the fitting and adjustable in said fitting in the direction of the length of the arm, and a pipe-positioning element adjustably secured on said arm.

In testimony whereof, I have signed my name to this specification.

JOHN L. SCHALLER.